United States Patent
Phatak et al.

(10) Patent No.: US 11,615,660 B2
(45) Date of Patent: Mar. 28, 2023

(54) IDENTIFYING A FAILED TURBOCHARGER OF A PLURALITY OF TURBOCHARGERS

(71) Applicant: Caterpillar Inc., Peoria, IL (US)

(72) Inventors: Deepashri Phatak, Peoria, IL (US); Dereck G Heffron, Peoria, IL (US); Joseph Patrick Karasch, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 121 days.

(21) Appl. No.: 16/950,623

(22) Filed: Nov. 17, 2020

(65) Prior Publication Data
US 2022/0157098 A1 May 19, 2022

(51) Int. Cl.
  *G07C 5/08* (2006.01)
  *F02B 37/00* (2006.01)
  (Continued)

(52) U.S. Cl.
  CPC .......... *G07C 5/0825* (2013.01); *F02B 37/001* (2013.01); *F02B 39/16* (2013.01);
  (Continued)

(58) Field of Classification Search
  CPC ..... G07C 5/0825; G07C 5/008; F02B 37/001; F02B 37/16; F02B 37/007; F02B 37/18;
  (Continued)

(56) References Cited

U.S. PATENT DOCUMENTS

| 6,202,415 B1 * | 3/2001 | Lohmann ............... F02D 23/00 701/111 |
| 9,976,474 B2 | 5/2018 | Thompson et al. |

(Continued)

FOREIGN PATENT DOCUMENTS

| DE | 19615033 A1 | 10/1997 |
| EP | 0730088 B1 | 3/2000 |
| JP | 2009024630 A | 2/2009 |
| WO | 2012075055 A2 | 6/2012 |

OTHER PUBLICATIONS

EP Extended Search Report for Patent Appln. No. 21203310.4-1004 dated Apr. 5, 2022 (9 pgs).

*Primary Examiner* — George C Jin
(74) *Attorney, Agent, or Firm* — Harrity & Harrity, LLP

(57) ABSTRACT

A controller may obtain data associated with operation of an engine of a machine that comprises a first engine bank associated with a first set of turbochargers and a second engine bank associated with a second set of turbochargers, and may determine, based on the data, that the engine is in an operating state that requires the first and second sets of turbochargers to be operative. The controller may determine, based on the data, a difference in operation of the first engine bank and the second engine bank and identify, based on the data, a turbocharger failure condition associated with a particular set of turbochargers, of the first and second sets of turbochargers. The controller may identify, based on the data, a particular turbocharger, of the particular set of turbochargers, as a failed turbocharger, and may perform one or more actions based on identifying the particular turbocharger.

20 Claims, 3 Drawing Sheets

(51) Int. Cl.
  *F02B 39/16* (2006.01)
  *F02D 41/22* (2006.01)
  *G07C 5/00* (2006.01)

(52) U.S. Cl.
  CPC ............. *F02D 41/22* (2013.01); *G07C 5/008* (2013.01); *G07C 5/085* (2013.01); *G07C 5/0808* (2013.01); *F02D 2200/0406* (2013.01); *F02D 2200/101* (2013.01); *F02D 2200/703* (2013.01)

(58) Field of Classification Search
  CPC ...... F02B 39/16; F02B 29/0412; F02D 41/22; F02D 41/221; F02D 41/1443
  See application file for complete search history.

(56) References Cited

U.S. PATENT DOCUMENTS

| | | | |
|---|---|---|---|
| 10,287,988 | B2 | 5/2019 | Asati et al. |
| 10,746,089 | B2 | 8/2020 | Byrd |
| 2006/0260306 | A1 | 11/2006 | Henn |
| 2007/0150333 | A1 | 6/2007 | Hurst et al. |
| 2016/0078695 | A1 | 3/2016 | McClintic et al. |
| 2016/0103032 | A1 | 4/2016 | Nakano |
| 2017/0006135 | A1 | 1/2017 | Siebel et al. |
| 2017/0226942 | A1* | 8/2017 | Denner ................. F02B 37/004 |
| 2017/0298810 | A1* | 10/2017 | Thompson ............ F02B 37/001 |
| 2019/0226389 | A1* | 7/2019 | Byrd ........................ F02C 6/12 |
| 2021/0079865 | A1* | 3/2021 | Ward ................... G07C 5/0808 |

* cited by examiner

IDENTIFYING A FAILED TURBOCHARGER OF A PLURALITY OF TURBOCHARGERS

TECHNICAL FIELD

The present disclosure relates generally to identifying a turbocharger failure associated with a plurality of turbochargers of an engine and, for example, to identifying failure of a particular turbocharger of the plurality of turbochargers.

BACKGROUND

An internal combustion engine may include a plurality of turbochargers to increase a power output of the engine. A flow of exhaust gas produced by the engine turns turbines of the turbochargers, which drive compressors of the turbochargers to increase a pressure of intake air provided to the engine. The increased density of the intake air allows for more air and fuel to enter combustion chambers of the engine and thereby allows an increased power output of the engine. In some cases, a turbocharger, of the plurality of turbochargers, may fail (e.g., the turbocharger may stop operating such that the compressor of the turbocharger does not compress intake air). This may result in a reduced performance of the engine (e.g., a reduced power output) and/or damage to the engine. Typically, an operator of the engine is not able to determine whether a turbocharger has failed without performing diagnostics on each of the plurality of turbochargers.

U.S. Pat. No. 9,976,474 (the '474 patent) discloses a process for monitoring turbocharger operation in a machine. The '474 patent discloses a controller that is configured to detect an anomaly in turbocharger speed for one or more of turbochargers of a power source based on at least the differential pressure across an air inlet passageway for the one or more turbochargers. Moreover, per the '474 patent, the controller monitors the differential pressure across the air inlet passageway for each turbocharger in each of a first pair of turbochargers and a second pair of turbochargers, compares the differential pressure across the air inlet passageway for each turbocharger in each pair of turbochargers to the differential pressure across the air inlet passageway for each of the other turbochargers in the first and second pair of turbochargers, and indicates an anomaly in turbocharger speed when the differential pressure across the air inlet passageway for one turbocharger exceeds the differential pressure across the air inlet passageway for another turbocharger by a threshold amount.

The '474 patent is directed to detecting anomalies in turbocharger speed to prevent turbocharger failure. However, a need exists to determine whether a turbocharger has already failed. Accordingly, the controller of the present disclosure solves one or more of the problems set forth above and/or other problems in the art.

SUMMARY

In some implementations, a controller includes one or more memories; and one or more processors, communicatively coupled to the one or more memories, configured to: obtain data associated with operation of an engine of a machine, wherein the engine includes a first engine bank associated with a first set of turbochargers and a second engine bank associated with a second set of turbochargers; determine, based on the data, that the engine is in an operating state that requires the first set of turbochargers and the second set of turbochargers to be operative; determine, based on the data and after determining that the engine is in the operating state that requires the first set of turbochargers and the second set of turbochargers to be operative, a difference in operation of the first engine bank and the second engine bank; identify, based on the data and after determining the difference in operation of the first engine bank and the second engine bank, a turbocharger failure condition associated with a particular set of turbochargers, of the first set of turbochargers and the second set of turbochargers; identify, based on the data and after identifying the turbocharger failure condition associated with the particular set of turbochargers, a particular turbocharger, of the particular set of turbochargers, as a failed turbocharger; and perform one or more actions based on identifying the particular turbocharger as the failed turbocharger.

In some implementations, a non-transitory computer-readable medium storing a set of instructions includes one or more instructions that, when executed by one or more processors of a controller, cause the controller to: obtain data associated with operation of an engine of a machine, wherein the engine includes a first engine bank associated with a first set of turbochargers and a second engine bank associated with a second set of turbochargers; determine, based on the data, that the engine is in an operating state that requires the first set of turbochargers and the second set of turbochargers to be operative; determine, after determining that the engine is in the operating state that requires the first set of turbochargers and the second set of turbochargers are to be operative, a difference in operation of the first engine bank and the second engine bank based on the data; identify, after determining the difference in operation of the first engine bank and the second engine bank, a turbocharger failure condition associated with a particular set of turbochargers, of the first set of turbochargers and the second set of turbochargers, based on the data; identify, after identifying the turbocharger failure condition associated with the particular set of turbochargers, a particular turbocharger, of the particular set of turbochargers, as a failed turbocharger based on the data; and cause information identifying the particular turbocharger as the failed turbocharger to be displayed on a display screen of the machine.

In some implementations, a method includes obtaining, by a controller, data associated with operation of an engine of a machine that comprises a first engine bank and a second engine bank, determining, by the controller and based on the data, that the engine is in a turbocharger operative state that requires a first set of turbochargers associated with the first engine bank and a second set of turbochargers associated with the second engine bank to be operative; determining, by the controller and after determining that the engine is in the turbocharger operative state, a difference in operation of the first engine bank and the second engine bank based on the data; identifying, by the controller and after determining the difference in operation of the first engine bank and the second engine bank, a turbocharger failure condition associated with a particular set of turbochargers, of the first set of turbochargers and the second set of turbochargers, based on the data; identifying, by the controller and after identifying the turbocharger failure condition associated with the particular set of turbochargers, one or more particular turbochargers, of the particular set of turbochargers, as failed turbochargers based on the data; and performing, by the controller, one or more actions based on identifying the one or more particular turbochargers as failed turbochargers.

DETAILED DESCRIPTION

This disclosure relates to a controller that identifies a failed turbocharger of a plurality of turbochargers of a power system. The controller, as described herein, has universal applicability to any machine utilizing such a power system with a plurality of turbochargers. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, marine equipment, stationary equipment, generator sets, pumps, or the like.

Figure 1:
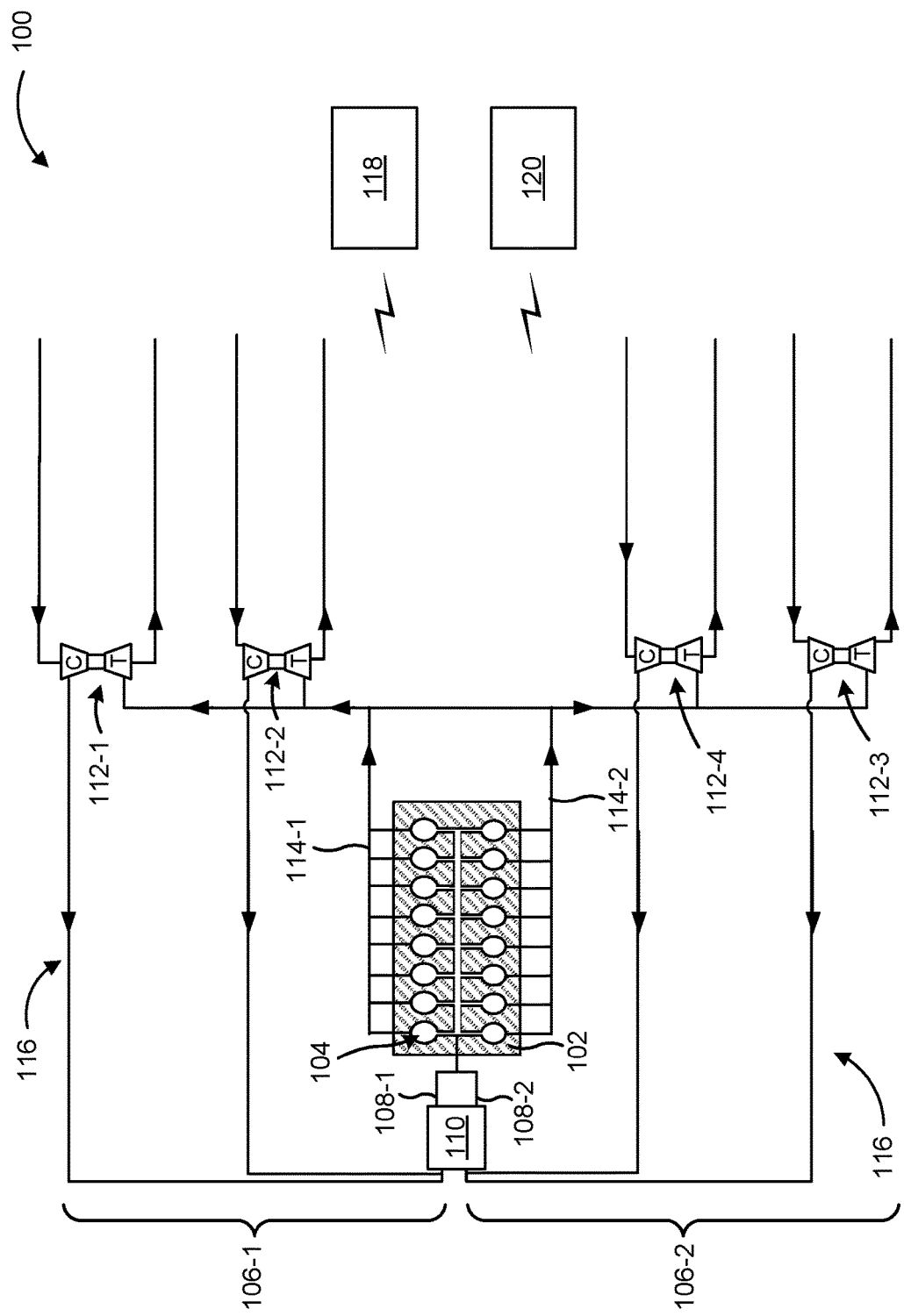
FIG. 1 is diagram of an example power system described herein.

FIG. 1 is a diagram of an example implementation of a power system 100 described herein. An engine 102 of power system 100 includes a plurality of cylinders 104 coupled to a crankshaft within a case. The crankshaft is connected to a plurality of pistons that are respectively housed (e.g., slidably and reciprocally) within the plurality of cylinders 104. Cylinder heads cover cylinders 104 to form combustion chambers that power the crankshaft to provide a useful mechanical working motion to a flywheel and/or output of engine 102. The plurality of cylinders 104 may be arranged in a plurality of rows, where each row is associated with an engine bank 106, of a plurality of engine banks 106 (shown as engine bank 106-1 and engine bank 106-2 in FIG. 1), of engine 102.

Air is provided to the plurality of cylinders 104 via an intake manifold 108. Intake manifold 108 may be a common intake manifold 108 fluidly connected to each of the plurality of cylinders 104. Alternatively, as shown in FIG. 1, a plurality of intake manifolds 108 (shown as intake manifold 108-1 and intake manifold 108-2) may be respectively connected to different sets of the plurality of cylinders 104 (e.g., intake manifold 108-1 may be fluidly connected to each of the cylinders 104 associated with engine bank 106-1 and intake manifold 108-2 may be fluidly connected to each of the cylinders 104 associated with engine bank 106-2). The plurality of intake manifolds 108 may receive the air through an intercooler 110 (e.g., a separate circuit air cooler (SCAC) and/or other type of intake cooling system) which may receive compressed air via a plurality of turbochargers 112 (referred to herein individually as "turbocharger 112", and collectively as "turbochargers 112").

During a combustion process, the plurality of cylinders 104 may produce an exhaust gas that exits engine 102 via an exhaust manifold 114. Exhaust manifold 114 may be a common exhaust manifold 114 fluidly connected to each of the plurality of cylinders 104. Alternatively, in some implementations, a plurality of exhaust manifolds 114 (shown as exhaust manifold 114-1 and exhaust manifold 114-2) may be respectively connected to sets of the plurality of cylinders 104. For example, as shown in FIG. 1, exhaust manifold 114-1 may be fluidly connected to each of the cylinders 104 associated with engine bank 106-1, and exhaust manifold 114-2 may be fluidly connected to each of the cylinders 104 associated with engine bank 106-2. Accordingly, first exhaust gas produced by cylinders 104 that are associated with engine bank 106-1 may exit engine 102 via exhaust manifold 114-1, and second exhaust gas produced by cylinders 104 that are associated with engine bank 106-1 may exit engine 102 via exhaust manifold 114-2.

The plurality of exhaust manifolds 114 may provide exhaust gases to the plurality of turbochargers 112 (shown as turbochargers 112-1 through 112-4). As shown, each turbocharger 112 includes a compressor ("C") and a turbine ("T") coupled by a turbocharger shaft. The turbocharger shaft is a common shaft of the compressor and turbine such that rotational speed of a turbine corresponds to rotational speed of the compressor. A set of turbochargers 112, of the plurality of turbochargers 112, may be associated with an engine bank 106, of the plurality of engine banks 106. For example, as shown in FIG. 1, a first set of turbochargers 112 that comprises turbocharger 112-1 and turbocharger 112-2 may be associated with engine bank 106-1, and a second set of turbochargers 112 that comprises turbocharger 112-3 and turbocharger 112-4 may be associated with engine bank 106-2. Accordingly, exhaust manifold 114-1 may provide the first exhaust gas to the first set of turbochargers 112 and exhaust manifold 114-2 may provide the second exhaust gas to the second set of turbochargers 112.

In FIG. 1, as exhaust gas flows to turbines of the plurality of turbochargers 112 and expand against vanes thereof, the turbines rotate and drive the compressors to pressurize inlet air (e.g., ambient air from an environment of power system 100). The pressurized inlet air is provided, via intake structure 116, as charged air to intercooler 110, which cools the charged air (e.g., decreases a temperature of the charged air) prior to the charged air being fed into intake manifold 108. In this way, engine 102 generates power via combustion of a mixture of fuel and the cooled, charged air within cylinders 104, which creates exhaust gases that are released from cylinders 104 via the multiple exhaust manifolds 114.

Power system 100 of FIG. 1 includes a controller 118 (e.g., an engine control module (ECM)) and a sensor system 120. Controller 118, as described further herein, monitors power system 100 and/or components of power system 100 to identify and/or locate a failed turbocharger 112. Sensor system 120 may provide measurements associated with various parameters used by controller 118 to monitor power system 100 and/or components of power system 100. Sensor system 120 may include physical sensors and/or any appropriate type of control system that generates values of sensing parameters based on a computational model and/or one or more measured parameters. As used herein, "sensing parameters" may refer to parameters that are directly measured and/or estimated by one or more sensors (e.g., physical sensors, virtual sensors, and/or the like). Example sensors may include temperature sensors (e.g., to measure a temperature of exhaust gas associated with engine bank 106-1 and/or engine bank 106-2, such as in terms of degrees Celsius (C)), speed sensors (e.g., to measure a speed of engine 102, such as in terms of revolutions per minute (RPM)), pressure sensors (e.g., to measure a pressure associated with intake manifold 108, compressor inlet pressure of a turbocharger 112, and/or an atmospheric pressure associated with engine 102 and/or power system 100, such as in terms of kilopascals (kPa)), and/or the like. Sensing parameters may also include any output parameters that may be measured indirectly by physical sensors and/or calculated based on readings of physical sensors, such as a load of engine 102.

As indicated above, FIG. 1 is provided as an example. Other examples may differ from what is described in connection with FIG. 1.

Figure 2:
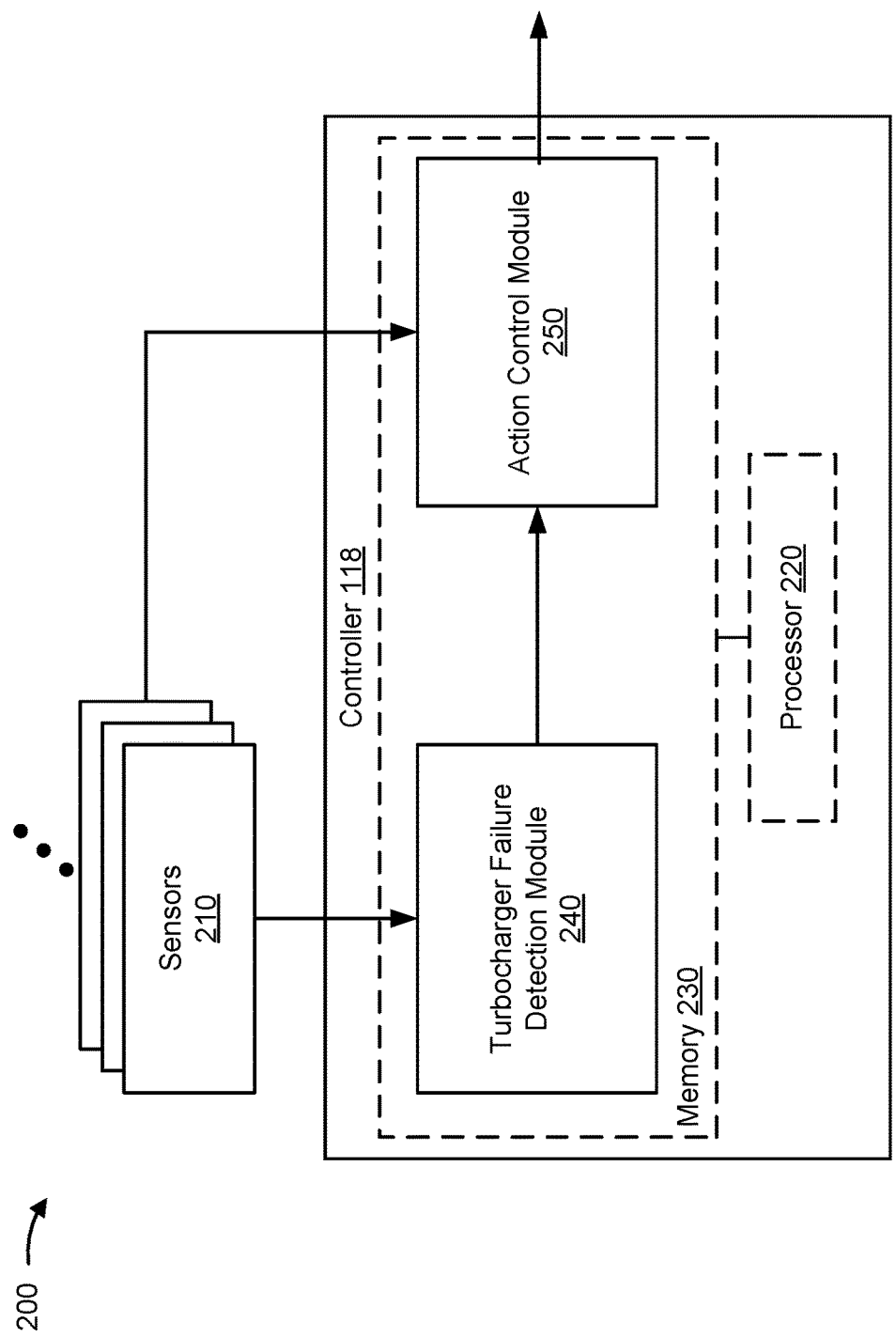
FIG. 2 is a diagram of an example turbocharger failure detection system described herein.

FIG. 2 is a diagram of an example turbocharger failure detection system 200 that may be included within the power system 100 of FIG. 1, as described herein. As shown in FIG. 2, turbocharger failure detection system 200 includes the controller 118 and one or more sensors 210. As shown in FIG. 2, the controller 118 includes a processor 220, a memory 230, a turbocharger failure detection module 240, and an action control module 250. As described herein, the controller 118 is implemented in hardware via processor 220 and/or memory 230.

Sensors 210 may include any type of sensor configured to measure operating conditions of power system 100 (e.g., to determine operating values corresponding to the operating conditions). Sensors 210 may be sensors of sensor system 120, as described herein. For example, sensors 210 may include temperature sensors to detect temperatures of air, exhaust, a component, coolant, and/or the like. Sensors 210 may include speed sensors (e.g., to detect an engine speed, a machine speed, and/or the like). Sensors 210 may include pressure sensors to detect a measure of compression of air or exhaust in power system 100.

Accordingly, one or more sensors 210 may be associated with one or more parameters (e.g., corresponding to operating conditions of engine 102) that may be monitored to identify a failed turbocharger 112 (e.g., in real-time) of power system 100, as described herein. For example, a value of a parameter associated with a sensor 210 may represent or indicate a measurement of sensor 210, such as a measured speed of engine 102 by a speed sensor; a measured pressure, such as a pressure of an intake manifold 108 (e.g., peak cylinder pressure (PCP), an intake manifold absolute pressure (IMAP), and/or the like), a compressor inlet pressure of a turbocharger 112, and/or an atmospheric pressure associated with engine 102, among other examples, by a pressure sensor; and/or a measured exhaust gas temperature (e.g., a turbine inlet exhaust gas temperature of a turbocharger 112, a turbine outlet exhaust gas temperature of a turbocharger 112, an exhaust gas temperature of an exhaust manifold 114, and/or the like) by a temperature sensor, and/or the like.

Processor 220 may be implemented in hardware, firmware, and/or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 220 may include one or more processors capable of being programmed to perform a function. Memory 230 includes a random-access memory (RAM), a read only memory (ROM), and/or another type of dynamic or static storage device (e.g., a flash memory, a magnetic memory, and/or an optical memory) that stores information and/or instructions for use by processor 220 (e.g., information and/or instructions associated with turbocharger failure detection module 240, action control module 250, and/or the like). Turbocharger failure detection module 240 includes one or more components or devices configured to identify and/or locate a failed turbocharger 112, as described herein. Action control module 250 includes one or more components or devices configured to perform one or more actions based on identifying and/or locating the failed turbocharger 112, as described herein.

Controller 118 (e.g., using turbocharger failure detection module 240) may obtain data associated with operation of engine 102 from sensors 210 (e.g., directly from sensors 210 or indirectly from sensors 210). The data may include, for example, information concerning a speed of engine 102; information concerning a load of engine 102; information concerning an exhaust gas temperature associated with engine bank 106-1 (e.g., an exhaust gas temperature associated with exhaust manifold 114-1, an exhaust temperature associated with turbocharger 112-1 and/or 112-2, and/or the like); information concerning an exhaust gas temperature associated with engine bank 106-2 (e.g., an exhaust gas temperature associated with exhaust manifold 114-2, an exhaust temperature associated with turbocharger 112-3 and/or 112-4, and/or the like); information concerning an intake manifold pressure associated with engine bank 106-1 (e.g., an intake manifold pressure associated with intake manifold 108-1); information concerning an intake manifold pressure associated with engine bank 106-2 (e.g., an intake manifold pressure associated with intake manifold 108-2); and/or information concerning an atmospheric pressure associated with engine 102. Controller 118 (e.g., using turbocharger failure detection module 240) may process the data to cause the data to be synchronized. For example, controller 118 may filter the data to retain only information that is associated with a particular time interval (e.g., 10 milliseconds, 100 milliseconds, and/or 1000 milliseconds, among other examples).

Controller 118 (e.g., using turbocharger failure detection module 240) may process the data to determine that engine 102 is in an operating state that requires the plurality of turbochargers 112 to be operative (e.g., for turbines of the plurality of turbochargers 112 to receive exhaust gas to drive compressors of the plurality of turbochargers to increase pressure of intake air provided to intake manifold 108). Controller 118 may determine that engine 102 is in an operative state, such as an acceleration state, that requires the first set of turbochargers 112 (e.g., that comprises turbochargers 112-1 and 112-2) associated with engine bank 106-1 and the second set of turbochargers 112 (e.g., that comprises turbochargers 112-3 and 112-4) associated with engine bank 106-2 to be operative. For example, controller 118 may determine, based on the data, whether a speed of the engine satisfies (e.g., is greater than or equal to) an engine speed threshold and whether a load of the engine satisfies (e.g., is greater than or equal to) an engine load threshold. When controller 118 determines that either the engine speed threshold or the engine load threshold is not satisfied, controller 118 may cease performing processing steps until controller 118 obtains new data from sensors 210.

Alternatively, when controller 118 determines that the engine speed threshold and the engine load threshold are both satisfied, and therefore determines that engine 102 is in an operating state that requires the plurality of turbochargers 112 to be operative, controller 118 (e.g., using turbocharger failure detection module 240) may determine whether there is a difference in operation of the plurality of engine banks 106 (e.g., a difference in operation of engine bank 106-1 and engine bank 106-2). For example, controller 118, based on the data, may determine an exhaust gas temperature difference (e.g., an absolute difference) between an exhaust gas temperature associated with engine bank 106-1 and an exhaust gas temperature associated with engine bank 106-2. When controller 118 determines that the exhaust gas temperature difference satisfies (e.g., is greater than or equal to) an exhaust temperature difference threshold, controller 118 may determine that engine bank 106-1 and engine bank 106-2 are operating differently. As another example, controller 118, based on the data, may determine an intake manifold pressure difference (e.g., an absolute difference) between an intake manifold pressure associated with engine bank 106-1 and an intake manifold pressure associated with engine bank 106-2. When controller 118 determines that the intake manifold pressure difference satisfies (e.g., is greater than or equal to) an intake manifold pressure difference threshold, controller 118 may determine that engine bank 106-1 and engine bank 106-2 are operating differently.

Controller 118 (e.g., using turbocharger failure detection module 240) may determine, after determining the difference in operation of the plurality of engine banks 106, whether a turbocharger failure condition associated with a set of turbochargers 112, of the plurality of turbochargers 112, exists. The turbocharger failure condition may indicate that at least one turbocharger 112 of the set of turbochargers 112 has failed. For example, controller 118 may determine, based on the data, that an intake manifold pressure (e.g., of intake manifold 108-1 or intake manifold 108-2) associated with a particular engine bank 106 (e.g., either engine bank 106-1 or engine bank 106-2) fails to satisfy (e.g., is less than) an intake manifold pressure threshold for a particular amount of time (e.g., 10 milliseconds, 100 milliseconds, and/or 1000 milliseconds, among other examples). Controller 118 may therefore identify a particular set of turbochargers 112 (e.g., either the first set of turbochargers 112 or the second set of turbochargers 112) that are associated with the particular engine bank 106 and identify the particular set of turbochargers 112 as associated with a turbocharger failure condition.

Controller 118 (e.g., using turbocharger failure detection module 240) may identify, after identifying the particular set of turbochargers 112 as associated with a turbocharger failure condition, at least one turbocharger 112, of the particular set of turbochargers 112, as a failed turbocharger (e.g., an inoperative turbocharger). For example, for a particular turbocharger 112 of the particular set of turbochargers 112, controller 118 may determine, based on the data, an atmospheric pressure associated with engine 102 and a compressor inlet pressure of the particular turbocharger. Controller 118 may determine that the compressor inlet pressure is greater than the atmospheric pressure (e.g., beyond a tolerance) and therefore may identify the particular turbocharger 112 as a failed turbocharger. Accordingly, controller 118 may determine (e.g., by searching a data structure associated with controller 118 based on an identifier associated with the particular turbocharger 112) to obtain information identifying a location of the particular turbocharger 112 (e.g., a position of the particular turbocharger 112 within engine 102, within the particular engine bank 106, and/or within the particular set of turbochargers 112).

Controller 118 (e.g., action control module 250) may perform, based on identifying at least one turbocharger 112 as a failed turbocharger, one or more actions. The one or more actions may include causing information identifying the at least one turbocharger as a failed turbocharger 112 (and/or a location of the at least one turbocharger 112) to be displayed on a display screen of a machine that includes the power system 100 and the turbocharger failure detection system 200. For example, controller 118 may send a message that includes the information to a controller associated with the display screen of the machine to cause the display screen to display the information (e.g., to an operator of the machine). Additionally, or alternatively, the one or more actions may include causing one or more indicator lights (e.g., warning or informational lights) of the machine to activate and/or one or more sounds to be presented via a speaker of the machine (e.g., a warning tone, an audible message indicating the information, and/or the like).

The one or more actions may include causing the information to be sent to a client device (e.g., a desktop computer, a laptop computer, and/or a smart phone, among other examples) to allow the information to be displayed on a display screen of the client device. For example, controller 118 may cause the information to be transmitted via a communication component (e.g., a wired or wireless communication device) to the client device to allow the client device to display the information. Additionally, or alternatively, the one or more actions may include storing the information in a data structure associated with controller 118 to allow a mechanic or technician to obtain the information when the machine is being serviced.

As indicated above, FIG. 2 is provided as an example. Other examples are possible and may differ from what was described in connection with FIG. 2.

Figure 3:
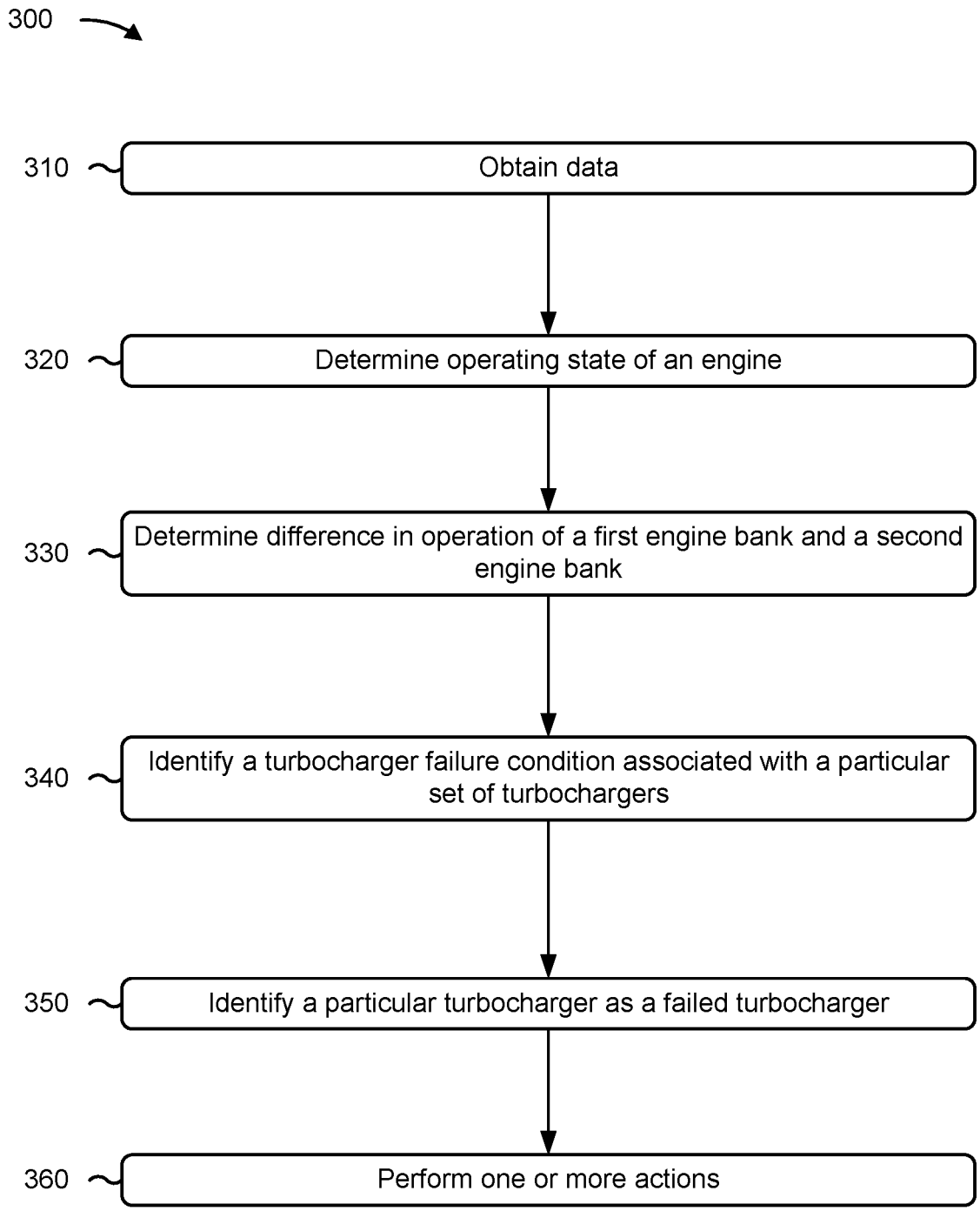
FIG. 3 is a flowchart of an example processes relating to identifying a failed turbocharger of a plurality of turbochargers.

FIG. 3 is a flowchart of an example process 300 associated with identifying a failed turbocharger of a plurality of turbochargers. One or more process blocks of FIG. 3 may be performed by a controller (e.g., controller 118). In some implementations, one or more process blocks of FIG. 3 may be performed by another device or a group of devices separate from or including the controller, such as a sensor (e.g., sensor 210).

As shown in FIG. 3, process 300 may include obtaining data (block 310). For example, the controller may obtain data associated with operation of an engine of a machine, wherein the engine includes a first engine bank associated with a first set of turbochargers and a second engine bank associated with a second set of turbochargers, as described above. The data may include at least one of information concerning a speed of the engine, information concerning a load of the engine, information concerning an exhaust gas temperature associated with the first engine bank, information concerning an exhaust gas temperature associated with the second engine bank, information concerning an intake manifold pressure associated with the first engine bank, information concerning an intake manifold pressure associated with the second engine bank, information concerning a respective compressor inlet pressure of the first set of turbochargers and the second set of turbochargers, or information concerning an atmospheric pressure associated with the engine.

As further shown in FIG. 3, process 300 may include determining an operating state of the engine (block 320). For example, the controller may determine, based on the data, that the engine is in an operating state that requires the first set of turbochargers and the second set of turbochargers to be operative, as described above. The controller may determine that the engine is in the operating state based on determining that a speed of the engine satisfies an engine speed threshold and/or determining that a load of the engine satisfies an engine load threshold.

As further shown in FIG. 3, process 300 may include determining a difference in operation of the first engine bank and the second engine bank (block 330). For example, the controller may determine, based on the data, a difference in operation of the first engine bank and the second engine bank, as described above. The controller may determine the difference in operation based on determining that a difference in exhaust gas temperatures respectively associated with the first engine bank and the second engine bank satisfies an exhaust gas temperature difference threshold, and/or determining that a difference in intake manifold pressures respectively associated with the first engine bank and the second engine bank satisfies an intake manifold pressure difference threshold.

As further shown in FIG. 3, process 300 may include identifying a turbocharger failure condition associated with a particular set of turbochargers (block 340). For example, the controller may identify, based on the data, a turbocharger failure condition associated with a particular set of turbochargers, of the first set of turbochargers and the second set of turbochargers, as described above. The controller may identify the turbocharger failure condition associated with the particular set of turbocharges by determining that an intake manifold pressure associated with an engine bank fails to satisfy an intake manifold pressure threshold for a particular amount of time, and identifying the set of turbochargers associated with the engine bank as the particular set of turbochargers associated with the turbocharger failure condition.

As further shown in FIG. 3, process 300 may include identifying a particular turbocharger as a failed turbocharger (block 350). For example, the controller may identify, based on the data, a particular turbocharger, of the particular set of turbochargers, as a failed turbocharger, as described above. The controller may identify the particular turbocharger as the failed turbocharger by determining, based on the data, a compressor inlet pressure of a turbocharger of the particular set of turbochargers, determining that the compressor inlet pressure of the turbocharger is greater than the atmospheric pressure, and identifying, based on determining that the compressor inlet pressure of the turbocharger is greater than the atmospheric pressure, the turbocharger as the failed turbocharger.

As further shown in FIG. 3, process 300 may include performing one or more actions (block 360). For example, the controller may perform one or more actions based on identifying the particular turbocharger as the failed turbocharger, as described above. The one or more actions may include causing information identifying the particular turbocharger as the failed turbocharger to be displayed on a display screen of the machine, causing information identifying the particular turbocharger as the failed turbocharger to be sent to a client device to allow the information to be displayed on a display screen of the client device, causing one or more indicator lights of the machine to activate, causing one or more sounds to be presented via a speaker of the machine, or storing information identifying the particular turbocharger as the failed turbocharger in a data structure associated with the controller.

Although FIG. 3 shows example blocks of process 300, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The above-described techniques allow a controller 118 of an engine 102 to identify a failed turbocharger 112 in a set of turbochargers 112 associated with an engine bank 106 of engine 102. Accordingly, controller 118 may perform one or more actions to provide information identifying the failed turbocharger 112 and/or a location of the failed turbocharger 112 to an operator of engine 102 and/or a technician that services engine 102. This facilitates prevention of damage to engine 102 (e.g., by allowing the operator to modify or cease operation of engine 102 to avoid actions that require use of the failed turbocharger 112). This also reduces an amount of time and/or resources (e.g., computing resources, such as processing resources, memory resources, communication resources, and/or power resources, among other examples) to service and/or maintain engine 102 by eliminating a need to perform diagnostics to identify and/or locate the failed turbocharger 112. Further, the controller 118 is able to identify and/or locate the failed turbocharger 112 based on data provided by conventional sensors associated with engine 102, thereby eliminating a need for turbocharger speed sensors or other sensors that could be used to identify and/or locate the failed turbocharger 112. This reduces an overall complexity associated with designing, operating, and/or maintaining engine 102.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A controller, comprising:
one or more memories; and
one or more processors, communicatively coupled to the one or more memories, configured to:
   obtain data associated with operation of an engine of a machine,
      wherein the engine includes a first engine bank associated with a first set of turbochargers and a second engine bank associated with a second set of turbochargers;
   determine, based on the data, that the engine is in an acceleration state that requires the first set of turbochargers and the second set of turbochargers to be operative;
   determine, based on the data and after determining that the engine is in the acceleration state that requires the first set of turbochargers and the second set of turbochargers to be operative, a difference in operation of the first engine bank and the second engine bank;
   identify, based on the data and after determining the difference in operation of the first engine bank and the second engine bank, a turbocharger failure condition associated with a particular set of turbochargers, of the first set of turbochargers and the second set of turbochargers;
   identify, based on the data and after identifying the turbocharger failure condition associated with the particular set of turbochargers, a particular turbocharger, of the particular set of turbochargers, as a failed turbocharger; and
   perform one or more actions based on identifying the particular turbocharger as the failed turbocharger.

2. The controller of claim 1, wherein the data includes at least one of:
   information concerning a speed of the engine;
   information concerning a load of the engine;
   information concerning an exhaust gas temperature associated with the first engine bank;

information concerning an exhaust gas temperature associated with the second engine bank;
information concerning an intake manifold pressure associated with the first engine bank;
information concerning an intake manifold pressure associated with the second engine bank;
information concerning a respective compressor inlet pressure of the first set of turbochargers and the second set of turbochargers; or
information concerning an atmospheric pressure associated with the engine.

3. The controller of claim 1, wherein the one or more processors are further configured to:
process, before determining that the engine is in the acceleration state when the first set of turbochargers and the second set of turbochargers are to be operative, the data, to cause the data to be synchronized according to a particular time interval.

4. The controller of claim 1, wherein the one or more processors are configured to, when determining that the engine is in the acceleration state that requires the first set of turbochargers and the second set of turbochargers to be operative:
determine, based on the data, that a speed of the engine satisfies an engine speed threshold; or
determine, based on the data, that a load of the engine satisfies an engine load threshold.

5. The controller of claim 1, wherein the one or more processors are configured to, when determining the difference in operation of the first engine bank and the second engine bank:
determine an exhaust gas temperature difference between an exhaust gas temperature associated with the first engine bank and an exhaust gas temperature associated with the second engine bank;
determine that the exhaust gas temperature difference satisfies an exhaust gas temperature difference threshold;
determine an intake manifold pressure difference between an intake manifold pressure associated with the first engine bank and an intake manifold pressure associated with the second engine bank; and
determine that the intake manifold pressure difference satisfies an intake manifold pressure difference threshold.

6. The controller of claim 1, wherein the one or more processors are configured to, when identifying the turbocharger failure condition associated with the particular set of turbochargers:
determine that an intake manifold pressure associated with the first engine bank fails to satisfy an intake manifold pressure threshold for a particular amount of time; and
identify, based on determining that the intake manifold pressure associated with the first engine bank fails to satisfy the intake manifold pressure threshold for the particular amount of time, the first set of turbochargers as the particular set of turbochargers associated with the turbocharger failure condition.

7. The controller of claim 1, wherein the one or more processors are configured to, when identifying the particular turbocharger as the failed turbocharger:
determine, based on the data, an atmospheric pressure associated with the engine;
determine, based on the data, a compressor inlet pressure of a turbocharger of the particular set of turbochargers;
determine that the compressor inlet pressure of the turbocharger is greater than the atmospheric pressure; and
identify, based on determining that the compressor inlet pressure of the turbocharger is greater than the atmospheric pressure, the turbocharger as the failed turbocharger.

8. The controller of claim 1, wherein the one or more processors are configured to, when performing the one or more actions:
cause information identifying the particular turbocharger as the failed turbocharger to be displayed on a display screen of the machine;
cause information identifying the particular turbocharger as the failed turbocharger to be sent to a client device to allow the information to be displayed on a display screen of the client device;
cause one or more indicator lights of the machine to activate;
cause one or more sounds to be presented via a speaker of the machine; or
store information identifying the particular turbocharger as the failed turbocharger in a data structure associated with the controller.

9. A non-transitory computer-readable medium storing a set of instructions, the set of instructions comprising:
one or more instructions that, when executed by one or more processors of a controller, cause the controller to:
obtain data associated with operation of an engine of a machine,
wherein the engine includes a first engine bank associated with a first set of turbochargers and a second engine bank associated with a second set of turbochargers;
determine, based on the data, that the engine is in an acceleration state that requires the first set of turbochargers and the second set of turbochargers to be operative;
determine, after determining that the engine is in the acceleration state that requires the first set of turbochargers and the second set of turbochargers are to be operative, a difference in operation of the first engine bank and the second engine bank based on the data;
identify, after determining the difference in operation of the first engine bank and the second engine bank, a turbocharger failure condition associated with a particular set of turbochargers, of the first set of turbochargers and the second set of turbochargers, based on the data;
identify, after identifying the turbocharger failure condition associated with the particular set of turbochargers, a particular turbocharger, of the particular set of turbochargers, as a failed turbocharger based on the data; and
cause information identifying the particular turbocharger as the failed turbocharger to be displayed on a display screen of the machine.

10. The non-transitory computer-readable medium of claim 9, wherein the one or more instructions further cause the controller to:
cause the data to be synchronized according to a particular time interval.

11. The non-transitory computer-readable medium of claim 9, wherein the one or more instructions, that cause the controller to determine that the engine is in the acceleration state that requires the first set of turbochargers and the second set of turbochargers to be operative, cause the controller to:

determine, based on the data, a speed of the engine;
determine that the speed of the engine satisfies an engine speed threshold;
determine, based on the data, a load of the engine; and
determine that the load of the engine satisfies an engine load threshold.

12. The non-transitory computer-readable medium of claim 9, wherein the one or more instructions, that cause the controller to determine the difference in operation of the first engine bank and the second engine bank, cause the controller to:
determine that a difference in exhaust gas temperatures respectively associated with the first engine bank and the second engine bank satisfies an exhaust gas temperature difference threshold; and
determine that a difference in intake manifold pressures respectively associated with the first engine bank and the second engine bank satisfies an intake manifold pressure difference threshold.

13. The non-transitory computer-readable medium of claim 9, wherein the one or more instructions, that cause the controller to identify the turbocharger failure condition associated with the particular set of turbochargers, cause the controller to:
determine that an intake manifold pressure associated with the second engine bank fails to satisfy an intake manifold pressure threshold for a particular amount of time; and
identify, based on determining that the intake manifold pressure associated with the second engine bank fails to satisfy the intake manifold pressure threshold for the particular amount of time, the second set of turbochargers as the particular set of turbochargers associated with the turbocharger failure condition.

14. The non-transitory computer-readable medium of claim 9, wherein the one or more instructions, that cause the controller to identify the particular turbocharger as the failed turbocharger, cause the controller to:
determine, based on the data, that a compressor inlet pressure of a turbocharger, of the particular set of turbochargers, is greater than an atmospheric pressure associated with the engine;
identify, based on determining that the compressor inlet pressure of the turbocharger is greater than the atmospheric pressure, the turbocharger as the failed turbocharger; and
determine a location of the turbocharger.

15. A method, comprising:
obtaining, by a controller, data associated with operation of an engine of a machine that comprises a first engine bank and a second engine bank;
determining, by the controller and based on the data, that the engine is in an acceleration state that requires a first set of turbochargers associated with the first engine bank and a second set of turbochargers associated with the second engine bank to be operative;
determining, by the controller and after determining that the engine is in the acceleration state, a difference in operation of the first engine bank and the second engine bank based on the data;
identifying, by the controller and after determining the difference in operation of the first engine bank and the second engine bank, a turbocharger failure condition associated with a particular set of turbochargers, of the first set of turbochargers and the second set of turbochargers, based on the data;
identifying, by the controller and after identifying the turbocharger failure condition associated with the particular set of turbochargers, one or more particular turbochargers, of the particular set of turbochargers, as failed turbochargers based on the data; and
performing, by the controller, one or more actions based on identifying the one or more particular turbochargers as failed turbochargers.

16. The method of claim 15, wherein determining that the engine is in the acceleration state comprises:
determining, based on the data, that a load of the engine satisfies an engine load threshold.

17. The method of claim 15, wherein determining the difference in operation of the first engine bank and the second engine bank comprises:
determining that a difference in exhaust gas temperatures respectively associated with the first engine bank and the second engine bank satisfies an exhaust gas temperature difference threshold; or
determining that a difference in intake manifold pressures respectively associated with the first engine bank and the second engine bank satisfies an intake manifold pressure difference threshold.

18. The method of claim 15, wherein identifying the turbocharger failure condition associated with the particular set of turbochargers comprises:
determining that an intake manifold pressure associated with the first engine bank fails to satisfy an intake manifold pressure threshold for a particular amount of time; and
identifying, based on determining that the intake manifold pressure associated with the first engine bank fails to satisfy the intake manifold pressure threshold for the particular amount of time, the first set of turbochargers as the particular set of turbochargers associated with the turbocharger failure condition.

19. The method of claim 15, wherein identifying the one or more particular turbochargers as failed turbochargers comprises:
determining, based on the data, an atmospheric pressure associated with the engine;
determining, based on the data, a respective compressor inlet pressure of the particular set of turbochargers;
determining that the respective compressor inlet pressures of one or more turbochargers, of the particular set of turbochargers, is greater than the atmospheric pressure; and
identifying, based on determining that the respective compressor inlet pressures of one or more turbochargers is greater than the atmospheric pressure, the one or more turbochargers as failed turbochargers.

20. The method of claim 15, wherein performing the one or more actions comprises at least one of:
causing information identifying the one or more particular turbochargers as failed turbochargers to be displayed on a display screen of the machine;
causing information identifying the one or more particular turbochargers as failed turbochargers to be sent to a client device to allow the information to be displayed on a display screen of the client device;
causing one or more indicator lights of the machine to activate;
causing one or more sounds to be presented via a speaker of the machine; or storing information identifying the one or more particular turbochargers as failed turbochargers in a data structure associated with the controller.

\* \* \* \* \*